United States Patent

Czarnecki et al.

[11] Patent Number: 5,874,918
[45] Date of Patent: Feb. 23, 1999

[54] DOPPLER TRIANGULATION TRANSMITTER LOCATION SYSTEM

[75] Inventors: Steven V. Czarnecki, Appalachia; James A. Johnson, Newark Valley; Clifford M. Gray, Owego; George VerWys, Vestal; Carl Gerst, Skaneatelos, all of N.Y.

[73] Assignee: Lockheed Martin Corporation, Bethesda, Md.

[21] Appl. No.: 731,193

[22] Filed: Oct. 7, 1996

[51] Int. Cl.$^6$ .................................................. G01S 5/02
[52] U.S. Cl. ............................................................ 242/417
[58] Field of Search .................................... 342/417, 418

[56] References Cited

U.S. PATENT DOCUMENTS

| | | | |
|---|---|---|---|
| 3,789,410 | 1/1974 | Smith et al. | 343/112 D |
| 3,863,256 | 1/1975 | Smith | 343/112 R |
| 3,947,803 | 3/1976 | Brown | 340/6 R |
| 4,238,785 | 12/1980 | Hannigan . | |
| 4,417,248 | 11/1983 | Mathews | 343/16 M |
| 4,546,355 | 10/1985 | Boles | 343/17 |
| 4,639,733 | 1/1987 | King et al. | 342/424 |
| 4,910,526 | 3/1990 | Donnangelo et al. | 345/455 |
| 5,343,212 | 8/1994 | Rose et al. | 342/424 |
| 5,406,291 | 4/1995 | Guerci et al. | 342/451 |

FOREIGN PATENT DOCUMENTS 2104753  7/1981  United Kingdom ............ G01S 13/42

*Primary Examiner*—Theodore M. Blum
*Attorney, Agent, or Firm*—Glenn W. Bowen

[57] ABSTRACT

In a system for locating the position of a transmitter, a platform containing an antenna is moved through a measurement path. The frequency received by the antenna is measured at measurement points distributed along a measurement path. The frequency is measured by cross correlating coherent pulses of the received frequency signal. An inertial navigation system on the platform indicates the position of the measurement path. A computer determines estimated locations by non-linear least squares convergence starting from trial locations. The non-linear least squares convergence is based on the frequency equation for the received frequency $$f = f_o + \frac{f_o}{C}\bar{V} \cdot \frac{\bar{r}}{|\bar{r}|}$$

in which $f_0$ is the transmitter frequency, $\bar{V}$ is the antenna velocity and $\bar{r}$ is the range of the transmitter. The computer evaluates a cost function derived from the frequency equation, for each location estimated by the non-linear least squares convergence and selects the estimated location with the lowest cost function as the best solution.

18 Claims, 4 Drawing Sheets

5,874,918

DOPPLER TRIANGULATION TRANSMITTER LOCATION SYSTEM

This invention relates to a system for locating the position of a transmitter by Doppler triangulation.

BACKGROUND OF THE INVENTION

Conventional techniques for estimating the location of a transmitter, such as direction finding triangulation, make use of line of bearing measurements, while the relative position of the transmitter and the platform from which the estimation is made changes. By knowing the geographic coordinates of the platform, the geographic coordinates of the transmitter can be estimated. In order to obtain an accurate measurement of the location of a transmitter from line of bearing measurements, there needs to be substantial relative cross range motion between the platform and the transmitter and this cross range motion requires time for the motion to be carried out. For many practical applications, the prior art techniques of locating the transmitter do not provide a solution to the problem with adequate performance. Particularly in some military applications, the speed and accuracy of the prior art systems are not satisfactory. The present invention provides a system which significantly improves the speed and accuracy of determining the solution of the transmitter location.

SUMMARY OF THE INVENTION

In the Doppler triangulation system of the invention, no direct measurements of the line of bearing of the transmitter is made. Instead, the frequency of the transmitted signal received by a platform moving relative to the transmitter is measured at specific instants of time as the platform moves through a measurement path.

The location of a transmitter is determined by making use of the change in frequencies received by the platform caused by Doppler effect. The frequency of the signal received by an antenna moving relative to a transmitter can be represented in vector notation as follows:

$$f = f_o - \frac{f_0}{C}\left(\overline{V}\cdot\frac{\overline{r}}{|\overline{r}|}\right) \quad (1)$$

in which f is the detected frequency, $f_0$ is the transmitter frequency being detected, C is the rate of travel of the signal in the transmitting median, i.e., the speed of light in the case of a radio signal, $\overline{V}$ is the velocity of the antenna, $\overline{r}$ is the range vector from the transmitter to the antenna. The expression of Equation (1) can be written in scaler form as follows:

$$f = f_o - \frac{f_o}{C} V\cos\theta \quad (2)$$

wherein V is the scaler velocity of the antenna and θ is the angle between the range vector and the direction of travel of the antenna. If a constant drift in the transmitter frequency is assumed, then the expression for the measured frequency becomes:

$$f = f_0 + f_d{}^t - \frac{f_0}{C}\left(\overline{V}\cdot\frac{\overline{r}}{|\overline{r}|}\right) \quad (3)$$

in which $f_d$ is the drift rate and t is the elapsed time.

In accordance with the invention, the frequency detected by the antenna is repeatedly measured as the platform carries the antenna through a measurement path to provide a series of frequency measurements distributed at measurement points along the measurement path. An inertial navigation system continuously tracks the position and attitude of the platform and from this information, the position, velocity and bore site of the antenna is tracked through the measurement path.

The average direction of the boresight of the antenna during the flight through the measurement path is determined and two trial locations at widely separated positions are selected on the side of the platform corresponding to the average boresight direction. A third trial location will be a previously estimated position for the transmitter if one is available. A non-linear least squares convergence based on Equation (1) or Equation (3) is attempted starting from each trial location. For each location to which convergence is achieved, a cost function, based on Equation (1) or Equation (3), is evaluated. The location with the lowest cost function is selected as the estimated location for the transmitter.

When the transmitted signal is a radar signal, the signal will be in the form of clusters of pulses, each pulse having a waveform at the frequency to be measured. The frequency of the transmitted signal is detected by cross correlating the pulses in each cluster to determine the elapsed time and the elapsed phase module 2π between each pair of cross correlated pulses. The frequency is then determined from the elapsed time and phase determinations.

DESCRIPTION OF A PREFERRED EMBODIMENT

Figure 1:
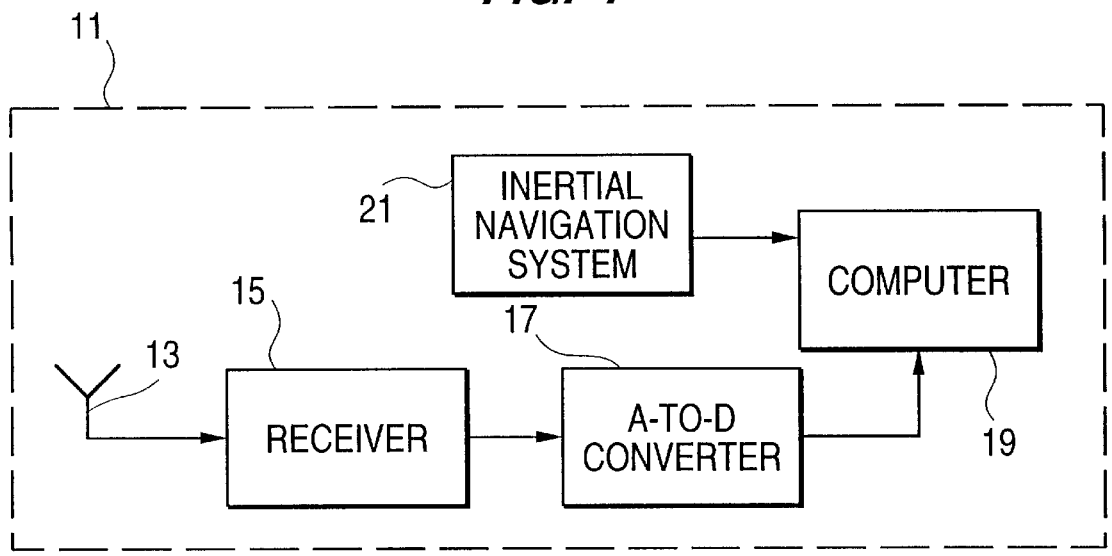
FIG. 1 is a block diagram of the system of the invention.

As shown in FIG. 1, the system of the invention comprises a platform 11, such as an aircraft, on which an antenna 13 is mounted. The platform holds a RF receiver 15, such as a radar receiver, for receiving a transmitted signal and converting the received signal to an IF signal, an A-to-D converter 17 which converts the IF signal to digital values representing amplitudes and phases of successive samples of the IF signal, a computer 19 for computing the position in accordance with the position determining algorithm of the invention, and an inertial navigation system 21 which continuously tracks the location and attitude of the platform 11. The specific embodiment of the invention represented in FIG. 1 is designed to receive and operate on radar signals varying from 0.5 gigahertz to 20 gigahertz. The receiver 15 includes a frequency converter making use of a local oscillator to reduce the detected frequency of the received signal to about 160 megahertz. The receiver also applies a digital signal to the computer representing the local oscillator frequency of the receiver. The digital values representing the phase samples of the pulses may be provided by a phase analog-to-digital converter as disclosed in U.S. Pat. No. 4,405,895.

Figure 2:
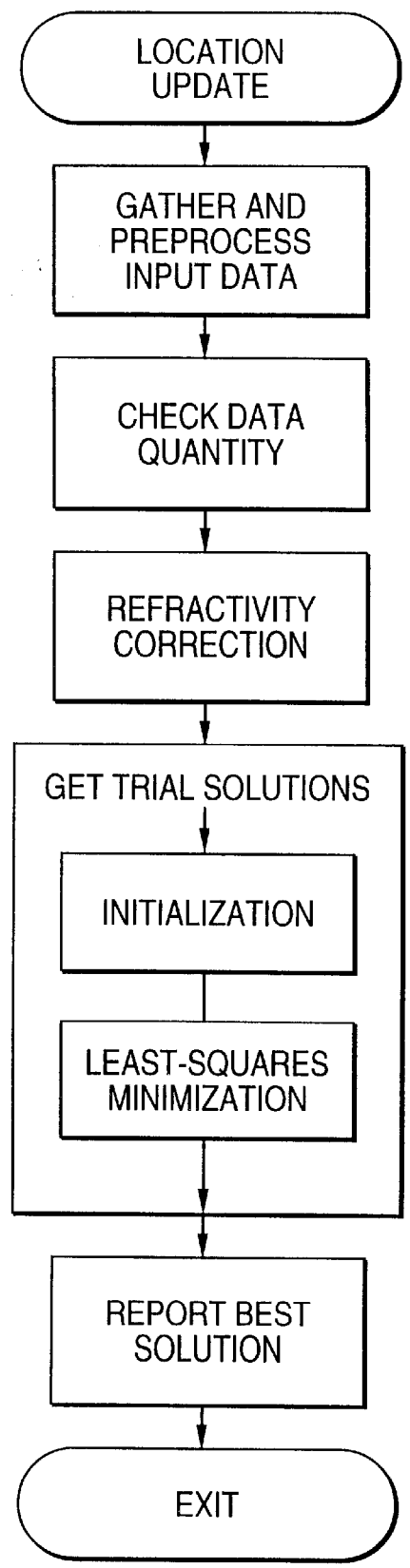
FIG. 2 is a flow chart of the computer program used in the system of FIG. 1 to acquire data and compute the estimated location of a transmitter.
Figure 3:
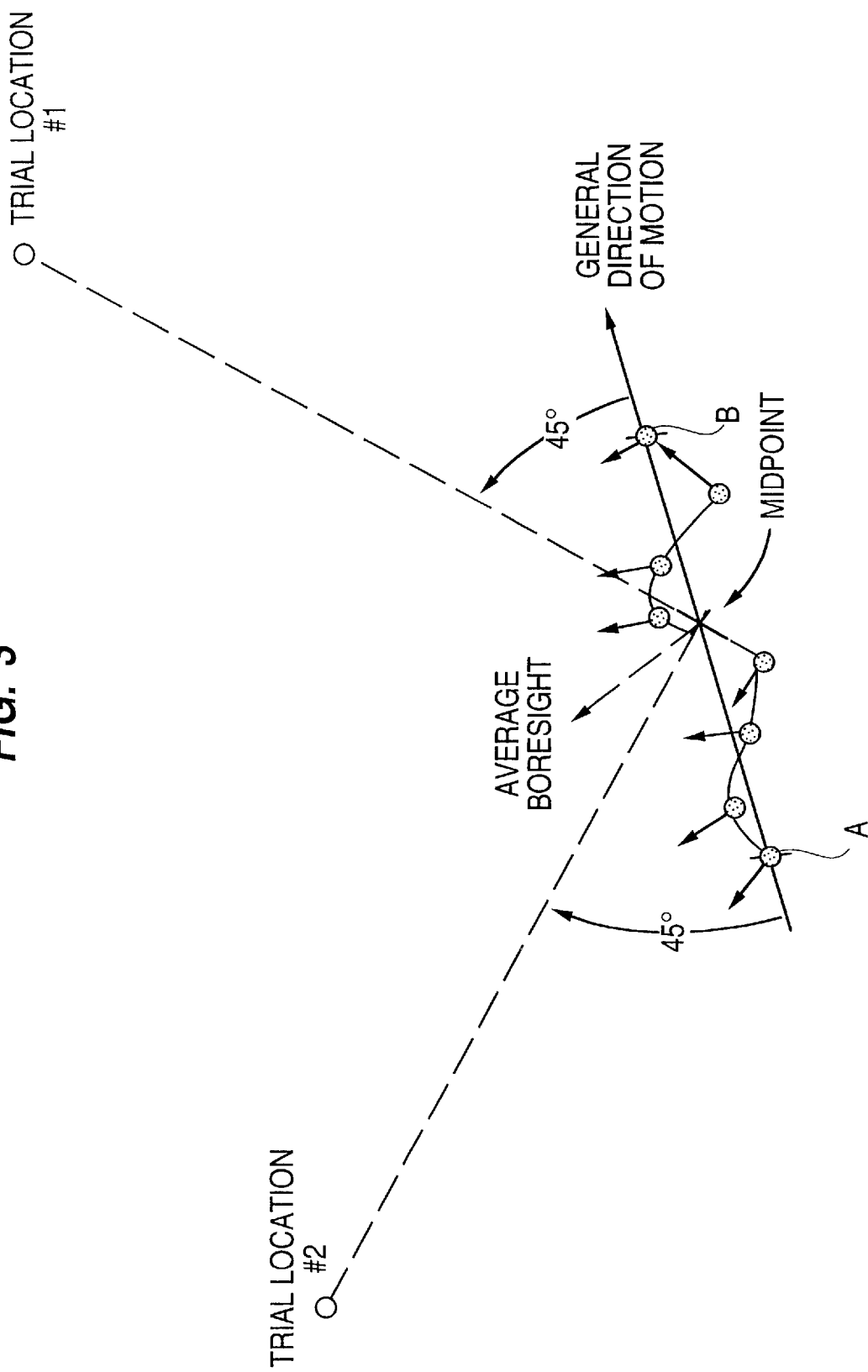
FIG. 3 is a diagram illustrating the operation of the system of the invention.

The flow chart shown in FIG. 2 illustrates the process carried out by the computer to locate the transmitter from the received data. The Appendix attached hereto is a source code listing of the process in C. As shown in FIG. 2, the first step of the algorithm is to gather and preprocess the input data as the platform travels on a measurement path as shown in FIG. 3. As the platform, or, more precisely, the antenna mounted on the platform, travels through a measurement path from point A to point B, radar pulses in clusters will be received from a transmitter. Each cluster will correspond to a different measurement point on the measurement path with the measurement points distributed over the measurement path from point A to point B. The measured points do not need to be uniformly distributed along the measurement path. The computer will receive digital values representing the amplitudes and phases of the pulses in the received clusters. From these digital values, the computer determines a representative frequency for each measurement point corresponding to a cluster and assigns a navigation tag to each cluster. The navigation tag comprises data obtained from the inertial navigation system and will be the position of the antenna at each measurement point and the boresight direction of the antenna at each measurement point.

Following the step of gathering and preprocessing the data, a check is made to determine whether or not sufficient data is present to make an accurate determination of the transmitter position. This check includes confirming that the number of clusters being processed exceeds a selected minimum, that the clusters were received over a time span that exceeds a selected minimum, and that the spacing between the clusters did not exceed a selected maximum. If the data quantity is insufficient as determined in this step, execution of the position determining algorithm is postponed until more clusters are obtained.

Following the step of checking the data quantity, the Z coordinate in the XYZ coordinate system is corrected for refractivity. After the refractivity correction, the process carries out the algorithm of locating the transmitter using the model of Equation (1) or (3). In the initialization portion of the location determining algorithm, two trial locations are arbitrarily selected as shown in FIG. 3, one at 45 degrees from the mid point of the vector between points A and B in the forward direction and the second trial location 45 degrees from the mid point of the direction vector in the aft direction. These points are placed along the left or right side of the flight path based on the average antenna boresight direction during the data collection. As pointed about above, a third trial location corresponds to a previously estimated transmitter location if one is available. A non-linear least squares convergence is attempted from each trial location using the model of Equation (1) or Equation (3). After convergence, the best solution is chosen by evaluating a cost function for each solution. The cost function is also based on the model of Equation (1) or Equation (3). Following the cost function evaluation, the location of the XY coordinates of the transmitter with the lowest cost function is reported and displayed.

Figure 4:
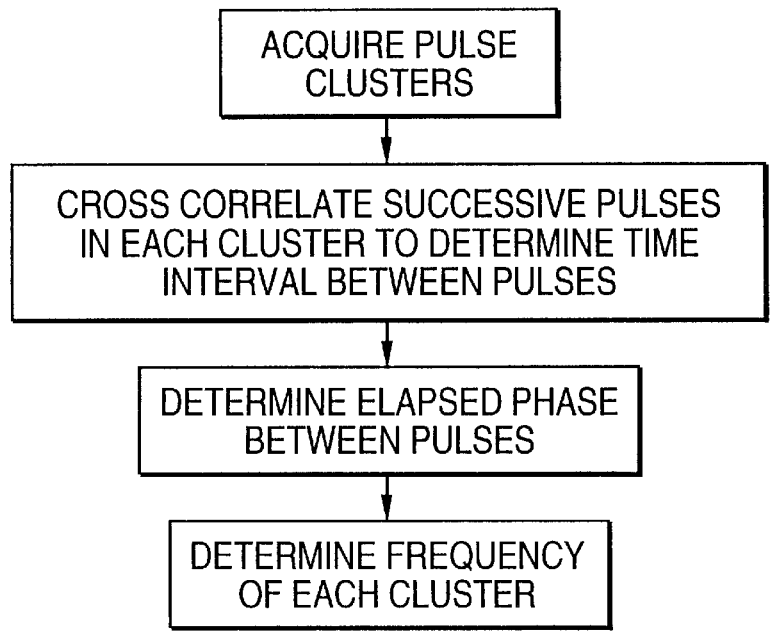
FIG. 4 is a flow chart illustrating the data acquisition portion of the computer program in more detail.

As shown in the flow chart of FIG. 4, in the preferred embodiment of the invention, the gather and preprocess data step involves acquiring a series of clusters of pulses detected by the antenna over a measurement interval during which the platform is moving through the measurement path. Each cluster comprises a series of coherent pulses received over a short time interval of a few milliseconds up to 100 milliseconds. The fact that the pulses are coherent means that each pulse starts at the same point in the carrier waveform cycle. Stated mathematically, coherency means that $$\frac{1}{T_n} = \frac{1}{N} fo$$

in which $T_n$ is the elapsed time between the pulse samples and N is an integer. Navigation data provided by the inertial navigation system on the platform indicates the location of the platform and the attitude of the platform at the time the cluster is received or, more specifically, at a time reference assigned specifically to the cluster. From this location, the location, velocity and boresight of the antenna is determined at the time of each measurement point corresponding to a cluster of pulses.

The A-to-D converter provides the computer with a series of amplitude and phase waveform samples of the received IF signal during each pulse of each cluster. To obtain a frequency measurement for a cluster, the waveform of each pulse of the cluster is cross-correlated with the succeeding pulse in the cluster. The frequency to be measured is the carrier frequency of the pulse waveform, which is much higher than the pulse repetition frequency in the cluster. The cross-correlation function yields a set of cross-correlation values for different time displacements between the pulses and these sets of values will have a maximum at the time displacement $\Delta T$ equal to the actual time interval between successive pulses. More specifically, when the first pulse is cross-correlated with the second pulse, a value $\Delta T$ will be determined corresponding to the time interval between the start of the first pulse and the start of the second pulse. An indication of the elapsed phase or phase difference between the start of the first pulse and the start of the second pulse can be determined from the correlation function:

$$C_{12}(\Delta T) = e^{i\Delta\phi} A^2 \qquad (4)$$

in which $C_{12}(\Delta T)$ is the magnitude of the correlation function for the time displacement $\Delta t$ between the two pulses and $\Delta\phi$ represents the elapsed phase or phase difference between the two pulses. From Equation (4), an indication of the elapsed phase $\Delta\phi$ can be determined in modulo $2\pi$. If the elapsed phase were known completely, the frequency could be determined directly from the equation:

$$f = \frac{\Delta\phi}{2\pi\Delta T}$$

In view of the fact that $\Delta\phi$ can be determined in modulo $2\pi$ from Equation (4), can be represented $\Delta\phi$ as follows:

$$[\Delta\phi = \widetilde{\Delta\phi} + n2\pi] \qquad (5)$$

in which $\widetilde{\Delta\phi}$ represents the modulo $2\pi$ value of $\Delta\phi$ and n is an unknown integer. Accordingly, the frequency of the waveform of the pulses of the cluster can be represented as:

$$f = \frac{\widetilde{\Delta\phi} + n2\pi}{2\pi\Delta T} = \frac{\widetilde{\Delta\phi}}{2\pi\Delta T} + \frac{n2\pi}{\Delta T} \qquad (6)$$

Thus, the formula for frequency has an ambiguity of $1/\Delta T$. In accordance with the invention, some of the ambiguity is resolved by using successive pairs of the pulses in the cluster to create a series of ambiguous expressions for the frequency as follows:

$$f = \frac{\widetilde{\Delta\phi}_1 + n_1 2\pi}{2\pi\Delta T_1} = \frac{\widetilde{\Delta\phi}_2 + n_2 2\pi}{2\pi\Delta T_2} = - - - - - \frac{\widetilde{\Delta\phi}_k + n_k 2\pi}{2\pi\Delta T_k} \qquad (7)$$

In Equation (7), the $\widetilde{\Delta\phi}_1$ through $\widetilde{\Delta\phi}_k$ represent the modulo phase values determined from the cross correlation of each successive pair of pulses in the cluster, $\Delta T_1$ through $\Delta T_k$ are the time intervals between each successive pair of pulses in the cluster and $n_1$ through $n_k$ are the corresponding unknown integers for each successive pair of pulses. Only some of the values $n_1$ through $n_k$ will satisfy Equation (7) and, accordingly, the ambiguity is reduced to a subset of $n_1$–$n_k$. To eliminate the remaining ambiguity, the slope of the phase change of each pulse is measured making use of the phase samples of the pulse waveform to provide a coarse estimate of the frequency. If the coarse estimate of the frequency is insufficiently accurate to resolve the remaining ambiguity, then one of the frequency solutions is arbitrarily selected as the frequency for the cluster and a corresponding frequency is selected for each of the clusters so that if one of the ambiguous frequencies is selected, the same corresponding ambiguous frequency will be selected for every cluster. The selected frequencies are then used in the transmitter location algorithm to determine the location of the transmitter. The algorithm will determine the correct location for the transmitter as long as all the frequencies correspond to the same ambiguity because the measurement of transmitter location comes from the value of $\Delta f$, the Doppler change in frequency due to motion of the platform, and this value will be the same for each corresponding set of the ambiguous frequencies. In fact, every ambiguous frequency represents an actual spectral component of the transmitted waveform.

The above system of determining the frequency lends itself to radar signal transmissions because the signal is transmitted in clusters of coherent pulses. The system can also be applied to a continuous signal transmission by acquiring clusters of coherent pulse samples of the transmitted waveform and cross correlating the pulse samples.

The frequency determined by the above-mentioned process for each of the clusters will be an intermediate frequency represented by the difference between the transmitter carrier frequency and the local oscillator frequency plus a Doppler shift frequency component.

The intermediate frequency measurements are corrected for variations in the local oscillator frequency caused by the local oscillator acceleration as indicated by the inertial guidance system. As a result of this correction, each frequency measurement will correspond to that which would be detected with a local oscillator that is insensitive to acceleration.

In the preferred embodiment of the invention, the frequency measurements used in the transmitter location algorithm are corrected intermediate frequencies, wherein the equation models (1) and (3) on which the algorithm is based express the frequency detected by the antenna. Since after correction for acceleration, the intermediate frequency measurements have a constant offset from the frequencies detected by the antenna, the corrected intermediate frequency measurements can be used directly in the algorithm because the constant local oscillator offset cancels out.

Figure 5:
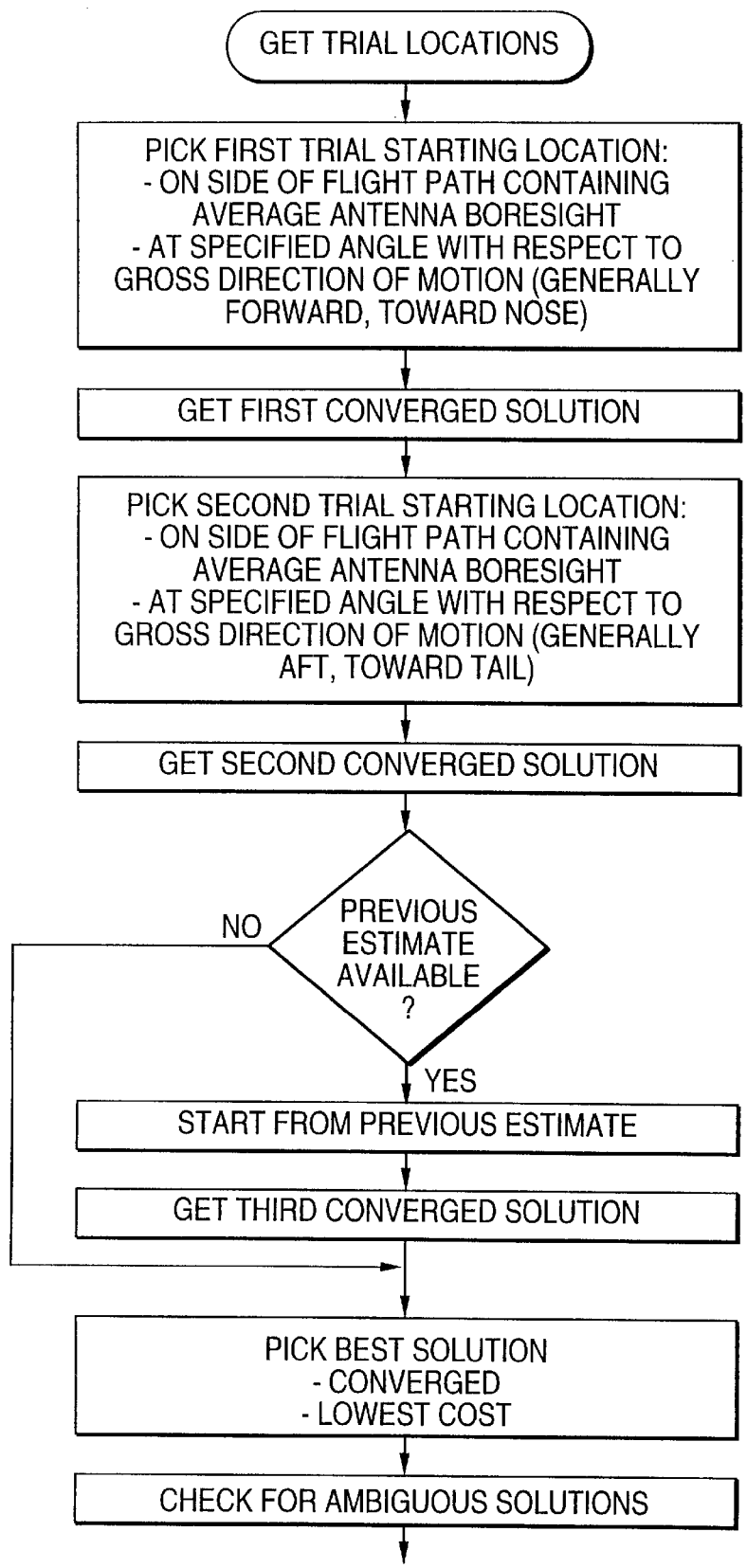
FIG. 5 is a flow chart illustrating the transmitter location portion of the computer program in more detail.

FIG. 5 illustrates a flow chart of the algorithm for determining the transmitter location from frequency measurements determined at the measurement points distributed along the measurement path as described above. The algorithm uses the signal model of Equation (3) which is repeated below:

$$f = f_0 + f_a{}^t - \frac{f_0}{C}\left(\overline{V}\cdot\frac{\overline{r}}{|\overline{r}|}\right) \qquad (3)$$

In Equation (3), the unknowns are the coordinates X and Y of the transmitter, $f_0$, and $f_d$ and can be expressed as a vector $\overline{x}$:

$$\overline{x} = \{X, Y f_0, f_d\} \qquad (8)$$

Accordingly, the frequency measurements may be expressed as a function of $\overline{x}$ as follows:

$$f(\overline{x}) = f_0 + f_a{}^t - \frac{f_0}{c}\left(V\cdot\frac{\overline{r}}{|\overline{r}|}\right) \qquad (9)$$

The algorithm performs a nonlinear least squares estimate of $\overline{x}$ starting from two or three trial locations. As shown in FIG. 3, one of the trial positions will be displaced 45 degrees from the gross direction of the motion of the platform at a selected range and a second trial position will be displaced 135° from the gross direction of motion of the platform. The average antenna boresight direction is used to determine if the trial locations should be placed to the left or right side of the flight path. The boresight used in this selection is the average boresight of the antenna as determined by the inertial navigation system for each of the measurement points. If the previous location of the transmitter determined by the system is available, this previous position will be used as a third trial position for the transmitter. The least squares algorithm is represented as:

$$\overline{\hat{x}}_{n+1} = \overline{\hat{x}}_n + \overline{\Delta x} \qquad (12)$$

in which $\overline{\hat{x}}_n$ represents the estimated values of the unknowns, X, Y, $f_0$ and $f_d$, $\overline{\Delta x}$ are the set of corrections added to the estimated unknowns $\overline{\hat{x}}$, and $\overline{\hat{x}}_{n+1}$ are the estimated values of the unknowns after a set of corrections have been added. The initial values of the unknowns $\overline{\hat{x}}_1$ are the X and Y coordinates of the trial locations, $f_0$ is set initially to be the mean frequency measurement measured at the measurement points and $f_d$ is initially set to zero. $\overline{\Delta x}$, representing a correction in the value of X, Y $f_0$ and $f_d$ to be added to the initial values in accordance with Equation (10), is determined in accordance with the following expression:

$$\overline{\Delta x} = (H^T R^{-1} H)^{-1} H^T R^{-1} \overline{z} \qquad (11)$$

in which H is a matrix of partial derivatives expressed as follows:

$$H \equiv \frac{\partial}{\partial \overline{x}} f(\overline{x})|_{\overline{x}} \qquad (12)$$

The partial derivatives of Equation 12 are:

$$\frac{\partial f(\overline{x})}{\partial X}, \frac{\partial f(\overline{x})}{\partial (Y)}, \frac{\partial f(\overline{x})}{\partial (fo)}, \frac{\partial (f\overline{x})}{\partial (fd)}. \qquad (13)$$

Each column of the matrix H is made up of a vector of one of the partial derivatives comprising evaluations of the partial derivative at each of the measurement points based on the predicted values of the unknowns $\overline{\hat{x}}$. In expression (11), $\overline{z}$ is a vector representing the difference between the measured frequency values and a set of predicted frequency measurements for currently estimated by the latest iteration of the least squares calculation. The vector $\overline{z}$ can be expressed as follows:

$$\overline{z} = \overline{f}_m - \overline{f}(\overline{\hat{x}}) \qquad (14)$$

In Equation (14), $\bar{f}_m$ is a vector representing the frequency measurements at the measurement points distributed along the measurement path and $\bar{f}(\hat{x})$ is a vector of the predicted frequency measurements at each of the measurement points. The predicted frequency measurements are determined from Equation (3) using the X and Y coordinates, fo, and fd from the latest calculation of $\bar{x}$. The matrix R in Expression (11) is a covariance matrix of the estimated error in the frequency measurements and in this application consists of a diagonal matrix in which the values are the frequency measurement variances. The frequency measurement errors at the different measurement points are assumed to be uncorrelated. After $x_1$ has been corrected to be $x_2$ in accordance with Equation (12), the process is repeated with the new $\Delta x$ until the expression (13) converges, at which point a location will have been estimated for the transmitter.

For each estimated location to which convergence is achieved as described above, a cost function is evaluated. The cost function evaluated is expressed as follows:

$$S = \bar{z}^T R^{-1} \bar{z} \tag{15}$$

The estimated locations are sorted by cost and the location with the lowest cost function is selected as the best solution.

An ambiguity check is then performed and if no ambiguity is found, the estimated location with the lowest cost function is reported and displayed. If more than one valid solution has been obtained in the least squares estimation, and if the valid solutions have nearly equal cost, and are not colocated, this means that the best solution determined by the cost evaluation is ambiguous and it is reported and displayed, but the ambiguity is indicated.

Thus, as described above, the system quickly determines the X and Y coordinates of the transmitter after the platform is moved through the measurement path.

The specific embodiment described above detects the position of a radio transmitter from a moving platform, presumably an air craft. The radio transmitter typically would be a radar transmitter, but the system can be used with equal facility to determine the position of the transmitter of radio signals used in communication. In addition, the system can be adapted to detect the position of a sonar transmitter or a sound signal when making the signal receiver a transducer for converting the transmitted sound wave into an electric signal.

These and other modifications can be made to the specific embodiment of the invention as described above without departing from the spirit and scope of the invention.

APPENDIX

```
Thu Nov  2 15:43:09 1995  /u/rtlt/proto/source/LF_Freq.c Page 1

1   /*                                                        LF_Freq.c    */
  2   /********************************************************************/
  3   /*     filename: LF_Freq.c                                             */
  4   /*     description: Emitter location using Doppler Frequency           */
  5   /*     language: C                                                     */
  6   /*     usage: used by LO                                               */
  7   /*     SETBIT info: 24XX                                               */
  8   /*     change history:                                                 */
  9   /*       1.49 08 Oct 94 jaj  Added #include "mathchk.h"                */
 10   /*            07 Nov 94 cmg  Fixed cluster screening logic, STR24      */
 11   /*            09 Nov 94 cmg  Added cluster list prints, STR27          */
 12   /*            11 Nov 94 cmg  Added calls to Poll_Disk_IO() (SUN), STR31*/
 13   /*                           also increased update period from 1->3 sec.*/
 14   /*            14 Feb 95 kjk  Replace call to Poll_Disk_IO with taskDelay*/
 15   /*            08 Mar 95 cmg  General upgrade prior to LBI implementation*/
 16   /*            02 Apr 95 cmg  LBI installation complete                 */
 17   /*            06 Apr 95 cmg  Added call to "LF_Pick_Display_Loc"       */
 18   /*            19 Apr 95 cmg  Added calls to LF_refresh_rwr_emitter_data*/
 19   /* str 88     24 Apr 95 rmw  Free invalid clusters from PB.            */
 20   /*            05 May 95 cmg  Added call to AIP_emitter_freq_update(),  */
 21   /*                           deleted e->t_update maintenance, and changed*/
 22   /*                           loc solution rate control to OE_System_time*/
 23   /*            17 May 95 cmg  Extracted some utilities to LF_Futil.c    */
 24   /*            18 May 95 ran  Added timing code to monitor different sections*/
 25   /*                           of location.                              */
 26   /*            22 May 95 cmg  Change cntl. scheme to 'one-emit-loc-per-call'*/
 27   /*            24 May 95 ran  Optimized timing code for minimal impact to*/
 28   /*                           rest of system.                           */
 29   /*            14 Aug 95 ran  Now using the new more general scheme of  */
 30   /*                           timing code.                              */
 31   /*            15 Aug 95 ran  Fixed STR no. 142, missing initialization.*/
 32   /*            31 Aug 95 cmg  Mods to integrate A2A location            */
 33   /*            06 Sep 95 ran  Re-worked LF_Location() control scheme.   */
 34   /*            27 Sep 95 kjk  Split Doppler Frequency from LF_Locat.c.  */
 35   /*       1.2  02 Oct 95 cmg  Improved time-stamp on failure logging    */
 36   /* str 153    26 Oct 95 kjk  Add extra call to AE_Transfer_Buffer()    */
 37   /*                                                                     */
 38   /********************************************************************/
 39
 40   #ifdef SUN
 41   #include <math.h>
 42   #include <stdioLib.h>
 43   #include <memLib.h>
 44   #include "mathchk.h"
 45
 46   #else
 47   #include <stdio.h>
 48   #include <stdlib.h>
 49   #include <math.h>
 50   #include "mathchk.h"
 51   #include <search.h>
 52   #include <memory.h>
 53   #endif
 54
```

```
Thu Nov  2 15:43:09 1995 /u/rtlt/proto/source/LF_Freq.c Page 2

55    #include "GD_Data.h"
 56    #include "LD_locat.h"
 57    #include "NL_navin.h"
 58    #include "NP_util.h"
 59    #include "LP_matrx.h"
 60    #include "NP_Proto.h"
 61    #include "LD_Missn.h"
 62    #include "ED_RWR.h"
 63    #include "LD_Ldisp.h"
 64    #include "OD_SBIT.h"
 65    #include "LF_Futil.h"
 66
 67
 68    /*****************************************************************/
 69    /*                                                     local data */
 70    /*****************************************************************/
 71
 72
 73    /*****************************************************************/
 74    /*                                                    global data */
 75    /*****************************************************************/
 76
 77
 78    /*****************************************************************/
 79    /*                                                     prototypes */
 80    /*****************************************************************/
 81
 82    void AIP_emitter_freq_update( GPP_emitter *pEmitter );   /* see AI_EmitR.c  */
 83
 84
 85    /*****************************************************************/
 86    /*                                                     pred_freq() */
 87    /*****************************************************************/
 88                              /* measurement model for signal frequency */
 89    double pred_freq( x, y, z, f0, fd, t, xp, xd, cf, fp, h )
 90           double   x, y, z ;
 91           double   f0, fd ;
 92           double   t ;
 93           double   xp[3], xd[3] ;
 94           double   cf ;
 95           double   *fp ;
 96           double   h[4] ;
 97    {
 98      int i;
 99      double u[3];
100      double r, rd;
101
102      u[0] = xp[0] - x;                  /* vector: emitter to platform */
103      u[1] = xp[1] - y;
104      u[2] = xp[2] - z;
105
106      r = SQRT( sq(u[0]) + sq(u[1]) + sq(u[2]) );     /* slant range, meters */
107
108      if( r<=0.0 ) return( 0.0 );                     /* give up */
```

Thu Nov  2 15:43:09 1995 /u/rtlt/proto/source/LF_Freq.c Page 3

```
109
110        for( i=0; i<3; i++ ) u[i] /= r;              /* unit vector: E-->platform */
111
112        rd = u[0]*xd[0] + u[1]*xd[1] + u[2]*xd[2];             /* range rate, m/s */
113
114        *fp = f0 - cf;          /* answer is offset from center.. to match meas. */
115
116        *fp += ( fd * t ) - ( f0 / C ) * rd;             /* add drift and doppler */
117
118                            /***** H-matrix *****/
119
120                                                     /* dU/dX  dotted with velocity */
121        h[0] = (1.0-u[0]*u[0])*xd[0] + (   -u[0]*u[1])*xd[1] + (-u[0]*u[2])*xd[2];
122
123        h[1] = (   -u[1]*u[0])*xd[0] + (1.0-u[1]*u[1])*xd[1] + (-u[1]*u[2])*xd[2];
124
125                                                   /* df / dX ... Hertz per meter */
126        for( i=0; i<2; i++ ) h[i] *= ( f0 ) / ( C * r );
127
128        h[2] = 1.0;                                  /*  df/df0... trivial */
129
130        h[3] = t;                           /*  df/dfd = t... close to trivial */
131
132        return( *fp );                 /* return predicted frequency as result */
133
134   } /* end.. pred_freq() */
135
136   /****************************************************************************/
137   /*                                                            solve_freq() */
138   /****************************************************************************/
139                                     /* location estimate based on frequency */
140   long solve_freq( sol, n, fm, vfm, t, x, xd, cf )
141        Loc_Solution_Type *sol ;
142        int     n ;
143        double  fm[], vfm[] ;
144        double  t[] ;
145        double  x[], xd[] ;
146.       double  cf[] ;
147   {
148
149        static double  h[ MX_MEAS ][4];              /* H-matrix  dF/dX */
150        static double  hr[4][ MX_MEAS ];                    /* Ht x invR */
151        double  hrz[4];                        /* Ht x inv R x residuals */
152        double  hrh[4*4];                          /* Ht x invR x H */
153
154        double  df_window, df2, meansq;
155        int     i, j, k, loops, n_state, converged;
156
157        double  evodd;                /* stuff for linear equation solution */
158        double  dx[4], dx0[4], amat[4*4];
159        int     rowperm[4];
160
161        long    failure;
162
```

```
Thu Nov  2 15:43:09 1995 /u/rtlt/proto/source/LF_Freq.c Page 4

163                                      /* Pointer to mission data, Loc section */
164          LD_Location_Mission_type *p_locm =
165              (LD_Location_Mission_type *)OD_mission_access[ct_l];
166
167                          /**********************************/
168                                                 /* set up initial guess */
169
170
171          sol->ans.x = sol->x0;
172          sol->ans.y = sol->y0;
173          sol->ans.h = sol->h0;
174          sol->ans.f0 = sol->f00;
175          sol->ans.fd = sol->fd0;
176
177          failure = 0;
178          sol->ans.invalid = 1;
179
180          sol->ans.n_meas = n;      /* save the number of measurements with solution */
181
182          df_window = 1.0E50;              /* start with a BIG residual tolerance */
183
184          if( sol->ans.drift_est ) n_state = 4;       /* will drift be estimated? */
185          else                     n_state = 3;
186          sol->ans.n_state = n_state;
187
188
189                              /* Long iteration loop to converge to a solution */
190          for( loops=0; loops<p_locm->freq_max_iter; loops++ )
191          {
192
193   #ifdef SUN
194             /* Release CPU to keep disk output going while location grinds away */
195             taskDelay( 1 );
196             GD_PGPtr_1->Proc_Watchdog_timer[GPP] = Set;
197             AE_Transfer_Buffer();
198   #endif
199                       /* emitter at constant altitude 'h' over a spherical earth */
200                       /* earth radius adjusted to model refractivity */
201             sol->ans.z = sol->ans.h -
202                     ( sq (sol->ans.x) + sq(sol->ans.y) ) /
203                         ( 2 * p_locm->earth_radius_factor * R0 );
204
205           /* predicted frequency and a row of the H-matrix for each measurement */
206           for( i=0; i<n; i++ )
207           {
208             pred_freq(
209                 sol->ans.x, sol->ans.y, sol->ans.z, sol->ans.f0, sol->ans.fd,
210                     t[i], x+3*i, xd+3*i, cf[i],    sol->fp+i, h[i] );
211
212           }  /* loop for predicted measurements */
213
214                                       /* Measurement residuals and editing */
215           for( j=0; j<4; j++ ) hrz[j] = 0.0;           /* initialize sums */
216           sol->ans.cost = meansq = 0.0;
```

```
Thu Nov  2 15:43:09 1995 /u/rtlt/proto/source/LP_Freq.c Page 5

217
218        for( sol->ans.n_good=0, i=0; i<n; i++ )    /* loop through measurements */
219        {
220            sol->df[i] = fm[i] - sol->fp[i];                         /* residual */
221            df2 = sq( sol->df[i] );                           /* squared residual */
222
223            if( df2 <= df_window )                                   /* editing */
224            {
225                sol->good[i] = 1;
226                sol->ans.n_good ++;
227                sol->ans.cost += df2 / vfm[i];   /* form weighted sum of squares */
228                meansq += df2;                               /* unweighted sum */
229
230                            /* form Ht x inv R   and  Ht x inv R x residual */
231                            /* assumes independent measurements (R is diag) */
232                for( j=0; j<4; j++ )
233                {
234                   hr[j][i] = h[i][j] / vfm[i];              /* Ht x inv R */
235                   hrz[j] += hr[j][i] * sol->df[i];    /* Ht x inv R x residual */
236                }
237            }
238            else
239            {
240                sol->good[i] = 0;
241                for( j=0; j<4; j++ ) hr[j][i] = 0.0;
242            }
243
244        } /* end.. residual processing loop */
245
246        if( sol->ans.n_good < p_locm->min_clust )
247        {
248            failure |= RC_min_meas_left;
249            converged = 0;
250            break;
251        }
252
253        if( sol->ans.n_good > 0 )
254        {
255            sol->ans.cost /= sol->ans.n_good; /* get weighted mean sq. residual */
256            meansq /= sol->ans.n_good;       /* unweighted mean square residual */
257        }
258                                    /* update editing window for next iteration */
259        df_window = sq( p_locm->freq_resid_thld ) * meansq;
260
261                                                       /* form Ht x invR x H */
262        for( i=0; i<n_state; i++ )
263            for( j=0; j<n_state; j++ )    /* mat mul: modified for n & n_state */
264                for(  hrh[n_state*i+j]=0.0, k=0; k<n; k++ )
265                        if( sol->good[k] ) hrh[n_state*i+j]+=hr[i][k] * h[k][j];
266
267                                                     /* copy the 'hrh' matrix */
268        for( i=0; i<(n_state*n_state); i++ ) amat[i] = hrh[i];
269
270                                                  /* solve for state correction */
```

```
Thu Nov  2 15:43:09 1995 /u/rtlt/proto/source/LF_Freq.c Page 6

271         ludcmp( amat, n_state, rowperm, &evodd );
272
273                             /* make a copy of 'hrz'... it's modified */
274         for( j=0; j<n_state; j++ ) dx0[j] = hrz[j];
275
276         lubksb( amat, n_state, rowperm, dx0 );      /* get raw correction, dx0 */
277
278                             /* reduce gain if any of the updates is too large */
279         sol->ans.gain = gain_limit( n_state,
280                         p_locm->freq_update_limit, dx0, dx );
281
282                                             /* update emitter location */
283         sol->ans.x  += dx[0];
284         sol->ans.y  += dx[1];
285         sol->ans.f0 += dx[2];
286         if( n_state > 3 ) sol->ans.fd += dx[3];
287
288                                             /* convergence test */
289         for( converged = 1, j=0; j<n_state; j++ )
290         if( ( fabs( dx0[j] ) / p_locm->
291                         freq_update_converged[j] ) > 1.0 )  converged = 0;
292         if( converged ) break;
293
294    } /* end... long loop for iterative solution */
295
296    sol->ans.iterations = loops;
297
298                     /* document actual data span used for final solution */
299    if( sol->ans.n_good > 0 )
300    {
301        sol->ans.t_first =  1.0E100;
302        sol->ans.t_last  = -1.0E100;
303        for( i=0; i<sol->ans.n_meas; i++ )
304        {
305            if( sol->good[i] )
306            {
307                if( sol->ans.t_first > t[i] ) sol->ans.t_first = t[i];
308                if( sol->ans.t_last  < t[i] ) sol->ans.t_last  = t[i];
309            }
310        } /* end.. search for actual data span times */
311    }
312    else
313    {
314        sol->ans.t_first = sol->ans.t_last = 0.0;
315    }
316
317
318    if( !converged ) failure |= RC_not_converged;
319    if( sol->ans.cost > p_locm->freq_max_sol_cost )
320                                             failure |= RC_max_sol_cost;
321    if( (sq(sol->ans.x) + sq(sol->ans.y)) > sq(p_locm->freq_max_range) )
322                                             failure |= RC_range_too_far;
323
324    for( k=0, i=0; i<MAX_STATE; i++ )   /* initialize the covariance estimate */
```

```
Thu Nov  2 15:43:09 1995 /u/rtlt/proto/source/LF_Freq.c Page 7

325                         for( j=i; j<MAX_STATE; j++ ) sol->ans.covar[k++] = 0.0;
326
327     if( failure )
328     {
329         sol->ans.invalid = failure;
330     }
331     else
332     {
333                                         /* table of standard state indices */
334         short is[4] = {ST_x, ST_y, ST_f0, ST_fd};
335
336         sol->ans.invalid = 0;
337                                         /* get the state error covariance matrix */
338         inverse( hrh, n_state, amat );
339
340                     /* move covariance to the output array in standard order */
341         for( i=0; i<n_state; i++ )
342         {
343             for( j=i; j<n_state; j++ )
344             {
345                 if( is[j] > is[i] )
346                     sol->ans.covar[CVdag(is[i])+is[j]-is[i]] = amat[n_state*i+j];
347                 else
348                     sol->ans.covar[CVdag(is[j])+is[i]-is[j]] = amat[n_state*i+j];
349             }
350         }
351
352     }  /* end.. 'not failure' block */
353
354     return( failure );
355
356 }  /* end.. solve_freq() */
357
358
359 /********************************************************************/
360 /*                                                       solcomp()  */
361 /********************************************************************/
362                 /* 'qsort()' function to rank trial solutions... best to worst */
363 int solcomp( s1, s2 )
364     Loc_Solution_Type ** s1, **s2 ;
365 {
366                         /* s1 better.. return -1;  s2 better.. return +1 */
367
368     if( (*s1)->ans.invalid )
369     {
370         if( (*s2)->ans.invalid ) return(  0 );
371         else                     return(  1 );
372     }
373     else
374     {
375         if( (*s2)->ans.invalid ) return( -1 );
376         else
377         {
378             if( (*s1)->ans.cost <= (*s2)->ans.cost ) return( -1 );
```

```
Thu Nov  2 15:43:09 1995 /u/rtlt/proto/source/LF_Freq.c Page 8

379              else                        return( 1 );
380         }
381     }
382
383 } /* end.. solcomp() */
384
385 /***********************************************************************/
386 /*                              LP_Freq_Location_Update()              */
387 /***********************************************************************/
388                                      /* update the location of an emitter */
389 long LP_Freq_Location_Update( GPP_emitter *emit, int *i_attempt )
390 {
391     #define N_LOC_SOLS  3
392
393     static double   t[ MX_MEAS ];       /* measurement times, system time, sec */
394     static double   x[ MX_MEAS ][3];        /* antenna position, XYZ, meters */
395     static double   xd[ MX_MEAS ][3];       /* antenna velocity, XYZ, m/s */
396     static double   fm[ MX_MEAS ];  /* meas freq, off cent, Hz (LO shift out) */
397     static double   vfm[ MX_MEAS ];                 /* frequency variance, Hz*2 */
398     static double   cf[ MX_MEAS ];      /* Nominal receiver center freq., Hertz */
399
400     double avg_bs[3];       /* 'average' boresight for left-right resolution */
401
402     long failure;                                   /* the return code */
403
404     double t0, span, gap, delta, xc[3], vv[3], right_left, tgt_ang, clusamp_db;
405     double dist, age, mincost;
406
407     int i, nm, iamb;
408
409     GPP_cluster *clust;
410
411     Loc_Solution_Type sol[ N_LOC_SOLS ];
412     Loc_Solution_Type *solsort[ N_LOC_SOLS ], *minsol;
413
414                              /* Pointer to mission data, Loc section */
415     LD_Location_Mission_type *p_locm =
416        (LD_Location_Mission_type *)OD_mission_access[ct_l];
417
418                     /*****************************/
419
420     SETBIT( 2405 );
421                             /* About to attempt a frequency-based location... */
422         /* Update the emitter frequency, and the frequencies of the clusters */
423                                     /* associated with the emitter */
424     AIP_emitter_freq_update( emit );
425
426     SETBIT( 2410 );
427     failure = 0;                /* start with a clean slate (return code) */
428     *i_attempt = 0;             /* indicate full solution was not attempted */
429
430         /*******************************************************/
431         /**                                                   **/
432         /**     GATHER DATA NEEDED TO LOCATE THE EMITTER      **/
```

```
Thu Nov  2 15:43:09 1995 /u/rtlt/proto/source/LF_Freq.c Page 9

433             /**                                                  **/
434             /******************************************************/
435
436         for( i=0; i<3; i++ ) avg_bs[i] = 0.0;    /* initialize summation to zero */
437
438                                                  /* print cluster data */
439         if ( IS_OPTW_ON( pw_misc, PO_loc_clust ) )
440         {
441            print_loc_clust( emit );
442         }
443
444                                                  /* establish a base time, 't0' */
445         for( t0=0.0, clust=emit->pCluster; clust != NULL;
446                                                  clust = clust->next_clust )
447         {
448            if
449            (
450                ( !clust->nav.invalid ) &&        /* need valid nav data */
451                ( clust->valid_flag )   &&
452                                                  /* frequency accuracy looks good */
453                ( clust->regr_freq_var <= p_locm->freq_var_thld )
454            )
455            {
456                                      /* cluster is good... save most recent time */
457
458               if( clust->nav.time > t0 ) t0 = clust->nav.time;
459            }
460
461         }  /* end... loop to get base time, 't0' */
462
463            /* loop through most recent clusters to collect and condition inputs */
464         for( nm=0, clust=emit->pCluster, i=0;
465               ( (nm<MX_MEAS) && (clust != NULL)) ;        i++ )
466         {
467
468                                       /* use the time-tag referenced to system time */
469            age = t0 - clust->nav.time;        /* relative age (usually positive) */
470                                                 /* Primary cluster validation */
471            if
472            (
473                ( !clust->nav.invalid ) &&        /* need valid nav data */
474                ( clust->valid_flag )   &&
475                                                  /* frequency accuracy looks good */
476                ( clust->freq_fit <= p_locm->freq_fit_tolerance ) &&
477                ( clust->regr_freq_var <= p_locm->freq_var_thld ) &&
478                          /* within sliding time window for frequency solution */
479                ( age <= p_locm->freq_loc_window )
480            )
481            {                                     /* cluster is good... use it */
482
483               t[nm] = -age;            /* relative time (usually negative) */
484
485            /* get INS position PLUS the lever-arm offset to the intercept antenna */
486               x[nm][0] = clust->nav.x + clust->nav.ant[ clust->channel ].x;
```

```
Thu Nov  2 15:43:09 1995 /u/rtlt/proto/source/LP_Freq.c Page 10

487            x[nm][1] = clust->nav.y + clust->nav.ant[ clust->channel ].y;
488            x[nm][2] = clust->nav.z + clust->nav.ant[ clust->channel ].z;
489
490        /* get INS velocity PLUS the lever-arm offset to the intercept antenna */
491            xd[nm][0] = clust->nav.xd + clust->nav.ant[ clust->channel ].xd;
492            xd[nm][1] = clust->nav.yd + clust->nav.ant[ clust->channel ].yd;
493            xd[nm][2] = clust->nav.zd + clust->nav.ant[ clust->channel ].zd;
494
495                        /* accumulate sum for 'average' antenna boresight */
496            avg_bs[0] += clust->nav.ant[ clust->channel ].xbs;
497            avg_bs[1] += clust->nav.ant[ clust->channel ].ybs;
498            avg_bs[2] += clust->nav.ant[ clust->channel ].zbs;
499
500        /* measured frequency in Hertz, relative to receiver center frequency */
501            fm[nm] = clust->freq_refined *
502                            (double) OD_mission_access_cm->hp_sample_rate;
503
504                    /* First LO on high-side.. frequency sense is reversed */
505            if( clust->lo_frequency > clust->center_freq ) fm[nm] = -fm[nm];
506
507                        /* put nominal receiver center frequency in table */
508            cf[nm] = clust->center_freq;
509
510            /* remove LO shift.. */
511            /* Note: fm will still be an offset from nominal 'center_freq' */
512            fm[nm] -= (fm[nm]+cf[nm]) * clust->lo_shift;
513
514                            /* get freq measurement variance in Hertz*2 */
515            clusamp_db = 0.25 * clust->amplitude;
516            if( p_locm->freq_alt_variance > 0.0 )
517            {                   /* get variance from mission parameters */
518                if( clusamp_db >= p_locm->freq_var_amplitude )
519                {
520                        /* high amplitude signal... constant (small) variance */
521                    vfm[nm] = p_locm->freq_alt_variance;
522                }
523                else            /* low amplitude signal gets higer variance */
524                {
525                    vfm[nm] = p_locm->freq_alt_variance *
526                        pow( 10.0,
527                            0.1 * (p_locm->freq_var_amplitude - clusamp_db) );
528                }
529            }
530            else                /* use variance reported from signal processing */
531            {
532                vfm[nm] = clust->freq_var *
533                        sq( (double) OD_mission_access_cm->hp_sample_rate );
534            }
535
536
537            nm++;                /* count good clusters... good 'measurements' */
538
539        } /* end... good-cluster block */
540
```

```
541         clust = clust->next_clust;          /* move on to the next cluster */
542
543     }   /* end.. loop through clusters to collect input data */
544
545         /*  ??? If necessary, time-sort data here ??? */
546
547         /****************************************************/
548         /**                                                **/
549         /**         CHECK QUANTITY OF DATA AVAILABLE       **/
550         /**                                                **/
551         /****************************************************/
552
553     SETBIT( 2411 );
554                                  /* see if data set is adequate to support a solution */
555     if( nm < p_locm->min_clust ) failure |= RC_min_clust;
556
557     span = t[0] - t[nm-1];              /* time span... most recent = t[0] */
558     if( span < p_locm->freq_min_span ) failure |= RC_min_span;
559
560                                  /* find largest time-gap in the data */
561     for( gap=0.0, i=nm-1; i>0; i-- )
562     {
563         delta = t[i-1] - t[i];
564         if( delta > gap ) gap = delta;
565     }
566     if( span > 0.0 ) gap /= span;       /* convert 'gap' to a fraction of span */
567     else gap = 0.0;
568      /* make sure the largest gap isn't too big a fraction of total time span */
569     if( gap > p_locm->max_gap ) failure |= RC_max_gap;
570
571     if( failure )
572     {
573         SETBIT( 2412 );
574
575                                  /* save some diagnostic information */
576         if( t0 > 0.0 ) emit->freq_sol_stat.fail_t0 = t0;
577         else if(emit->pCluster)
578                    emit->freq_sol_stat.fail_t0 = emit->pCluster->nav.time;
579         else       emit->freq_sol_stat.fail_t0 = 0.0;
580
581         emit->freq_sol_stat.fail_cost = -1.0;      /* no cost evaluated yet */
582         emit->freq_sol_stat.failure = failure;
583         emit->freq_sol_stat.fail_nm = nm;
584
585         if ( IS_OPTw_ON( pw_misc, PO_loc_updt ) ||
586                                   IS_OPTw_ON( pw_val,  PO_val_CG   ) )
587         {
588             print_loc_fail( emit, emit->freq_sol_stat.fail_t0, nm, failure, "data check" );
589         }
590
591         return( failure );
592
593     }
594
```

```
Thu Nov  2 15:43:09 1995 /u/rtlt/proto/source/LF_Freq.c Page 12

595        *i_attempt = 1;                    /* about to attempt full solution */
596
597                /**************************************************/
598                /**                                              **/
599                /**            REFRACTIVITY CORRECTION           **/
600                /**                                              **/
601                /**************************************************/
602
603                        /* adjust 'Z' a little bit to account for refractivity */
604        for( i=0; i<nm; i++ )
605        {
606            x[i][2] += p_locm->z_refract_factor *
607                                        ( sq( x[i][0] ) + sq( x[i][1] ) );
608        }
609
610                /**************************************************/
611                /**                                              **/
612                /**                GET A FEW SOLUTIONS           **/
613                /**                                              **/
614                /**************************************************/
615
616                        /* initialize some fields in trial solution blocks */
617        for( i=0; i<N_LOC_SOLS; i++ )
618        {
619            sol[i].ans.invalid = -1;
620            sol[i].ans.cost    = -1.0;
621            sol[i].ans.speed   =  0.0;
622            sol[i].ans.heading =  0.0;
623            sol[i].ans.fd      =  0.0;
624            sol[i].ans.p0      =  0.0;
625
626            sol[i].ans.ambiguous = 0;
627            sol[i].ans.n_meas  = 0;
628            sol[i].ans.n_good  = 0;
629            sol[i].ans.lat = 0.0;
630            sol[i].ans.lon = 0.0;
631
632            sol[i].ans.sol_number  = i;
633        }
634
635                /* midpoint of path aircraft traveled as data was collected */
636        xc[0] = (x[0][0] - x[nm][0])/2;
637        xc[1] = (x[0][1] - x[nm][1])/2;
638                                            /* general direction of motion */
639        vv[0] = x[0][0] - x[nm][0];
640        vv[1] = x[0][1] - x[nm][1];
641        dist = SQRT( sq(vv[0]) + sq(vv[1]) );
642        if( dist > 0.0 )
643        {
644            vv[0] /= dist;                  /* unit vector in XY plane */
645            vv[1] /= dist;                  /* along general direction of motion */
646        }
647
648                /* scale '|vv|' to a typical range, in meters (will be rotated) */
```

Thu Nov  2 15:43:09 1995 /u/rtlt/proto/source/LF_Freq.c Page 13

```
649         vv[0] *= p_locm->freq_initial_range;
650         vv[1] *= p_locm->freq_initial_range;
651
652             /* right_left = +1 if the target is expected on the right side of vv */
653         right_left = avg_bs[0] * vv[1] - avg_bs[1] * vv[0];
654         if( right_left >= 0.0 ) right_left =  1.0;
655         else                    right_left = -1.0;
656
657             /* set azimuth off general flight path for first trial location */
658         tgt_ang = right_left * ( PI / 180 ) * p_locm->freq_initial_bearing[0];
659
660                         /* initial emitter location guess for solution #0 */
661         sol[0].x0 = xc[0] + cos( tgt_ang ) * vv[0] + sin( tgt_ang ) * vv[1];
662         sol[0].y0 = xc[1] - sin( tgt_ang ) * vv[0] + cos( tgt_ang ) * vv[1];
663
664         sol[0].h0 = p_locm->std_alt;        /* standard altitude */
665         sol[0].f00 = fm[nm-1] + cf[nm-1];   /* most recent signal RF frequency */
666         sol[0].fd0 = 0.0;                                    /* zero drift */
667
668                                         /* estimate carrier drift ? (optional) */
669         sol[0].ans.drift_est = p_locm->freq_drift_est;
670
671         sol[0].ans.t_update = t0;      /* tag solution with most recent nav_time */
672
673         solve_freq( &sol[0], nm, fm, vfm, t, x, xd, cf );      /* get solution #0 */
674
675
676                 /* set azimuth off general flight path for second solution */
677         tgt_ang = right_left * ( PI / 180 ) * p_locm->freq_initial_bearing[1];
678
679                         /* initial emitter location guess for solution #1 */
680         sol[1].x0 = xc[0] + cos( tgt_ang ) * vv[0] + sin( tgt_ang ) * vv[1];
681         sol[1].y0 = xc[1] - sin( tgt_ang ) * vv[0] + cos( tgt_ang ) * vv[1];
682
683         sol[1].h0 = p_locm->std_alt;        /* standard altitude */
684         sol[1].f00 = fm[nm-1] + cf[nm-1];   /* most recent signal RF frequency */
685         sol[1].fd0 = 0.0;                                    /* zero drift */
686                                                 /* set 'drift estimation' flag */
687         sol[1].ans.drift_est = p_locm->freq_drift_est;
688
689         sol[1].ans.t_update = t0;      /* tag solution with most recent nav_time */
690
691         solve_freq( &sol[1], nm, fm, vfm, t, x, xd, cf );      /* get solution #1 */
692
693
694                 /* also try starting from an old result, if available */
695         sol[2].ans.invalid = -1;                /* start with an invalid flag */
696         if( (!emit->freq_sol.invalid) &&
697                 ( emit->freq_sol.t_update >
698                     ( t[0] - p_locm->max_reuse_age ) ) )
699         {
700             sol[2].x0 = emit->freq_sol.x;
701             sol[2].y0 = emit->freq_sol.y;
702
```

Thu Nov  2 15:43:09 1995 /u/rtlt/proto/source/LF_Freq.c Page 14

```
703         sol[2].h0 = p_locm->std_alt;        /* standard altitude */
704
705         sol[2].f00 = emit->freq_sol.f0;
706         sol[2].fd0 = emit->freq_sol.fd;
707                                             /* set 'drift estimation' flag */
708         sol[2].ans.drift_est = p_locm->freq_drift_est;
709
710         sol[2].ans.t_update = t0;      /* tag solution with most recent nav_time */
711
712         solve_freq( &sol[2], nm, fm, vfm, t, x, xd, cf );   /* get solution #2 */
713
714     } /* end.. start from old result */
715
716     for( i=0; i<N_LOC_SOLS; i++ )                       /* fix-up some nits */
717     {
718         sol[i].ans.t_first += t0;       /* set final data span to time-of-day */
719         sol[i].ans.t_last  += t0;
720     }
721
722
723         /*******************************************************/
724         /**                                                   **/
725         /**              PICK BEST SOLUTION                   **/
726         /**                                                   **/
727         /*******************************************************/
728
729     for( i=0; i<N_LOC_SOLS; i++ ) solsort[i] = sol+i; /* set up sorting table */
730
731                             /* rank the solutions... best into solsort[0] */
732     heap_sort( solsort, N_LOC_SOLS, sizeof(solsort[0]), solcomp );
733
734                                             /* is 'best' solution any good? */
735     if( solsort[0]->ans.invalid )
736     {
737                                                             /* no good! */
738         failure = solsort[0]->ans.invalid | RC_no_good_solution;
739
740                                                         /* find lowest cost */
741         for( minsol = &sol[0], mincost=1.0E200, i=0; i<N_LOC_SOLS; i++ )
742         {
743             if( (sol[i].ans.cost>0.0) && (sol[i].ans.cost<mincost) )
744             {
745                 mincost = sol[i].ans.cost;
746                 minsol = &sol[i];
747             }
748         }
749                                         /* save some diagnostic information */
750         emit->freq_sol_stat.fail_t0 = t0;
751         emit->freq_sol_stat.fail_cost = minsol->ans.cost;
752         emit->freq_sol_stat.failure = minsol->ans.invalid | RC_no_good_solution;
753         emit->freq_sol_stat.fail_nm = minsol->ans.n_meas;
754         emit->freq_sol_stat.fail_ng = minsol->ans.n_good;
755
756                                             /* Print "bad" solution stuff ? */
```

```
Thu Nov  2 15:43:09 1995 /u/rtlt/proto/source/LF_Freq.c Page 15

757            if ( IS_OPTw_ON( pw_misc,  PO_loc_updt ) ||
758                                       IS_OPTw_ON( pw_val,   PO_val_CG   )    )
759            {
760
761                print_location( emit, minsol, t );
762
763                                            /* print out solution data/residuals */
764                if IS_OPTw_ON( pw_misc, PO_loc_resid )
765                {
766                    print_loc_resid( emit, minsol, t, fm, vfm, cf, x, xd );
767                }
768
769            } /* end 'print' block */
770
771        } /* end... fail block */
772
773        else                             /* We have at least one good solution */
774        {
775
776                                         /* start with sols tagged unambiguous */
777            for( i=0; i<N_LOC_SOLS; i++ ) solsort[i]->ans.ambiguous = 0;
778            for( iamb=0, i=1; i<N_LOC_SOLS; i++ )    /* compare to other solutions */
779            {
780                                         /* if true, no other solutions compare to best */
781                if( ( solsort[i]->ans.invalid ) ||
782                        ( (solsort[i]->ans.cost /
783                           p_locm->equiv_cost_fact) >=
784                                                solsort[0]->ans.cost ) )
785                                                                    break;
786
787                    /* solution 'i' is nearly as good... is there an ambiguity ? */
788                dist = SQRT( sq( solsort[i]->ans.x - solsort[0]->ans.x ) +
789                             sq( solsort[i]->ans.y - solsort[0]->ans.y ) );
790
791            /* if 'dist' is small then two trials converged to the same solution */
792            /* if 'dist' is large, then there are ambiguous solutions */
793
794                if( dist > p_locm->ambig_sol_distance )
795                {
796                    solsort[0]->ans.ambiguous = 1;
797                    solsort[i]->ans.ambiguous = 1;
798                    if( iamb <= 0 ) iamb = i; /* save index of 'other' solution */
799                }
800
801            } /* end... compare to other solutions */
802
803            /******************************************************/
804            /**                                                  **/
805            /**                REPORT SOLUTION                   **/
806            /**                                                  **/
807            /******************************************************/
808
809                    /* in any case, sortsol[0] is good, and the best: so USE IT */
810            emit->freq_sol = solsort[0]->ans;
```

```
Thu Nov  2 15:43:09 1995 /u/rtlt/proto/source/LF_Freq.c Page 16

811
812               /* remove 'refractivity' adjustment: go back to actual earth radius */
813          emit->freq_sol.z -= p_locm->z_refract_factor *
814                              ( sq( emit->freq_sol.x ) + sq( emit->freq_sol.y ) );
815
816                    /* find latitude and longitude... altitude already set */
817          xy2ll(&emit->origin,
818                  emit->freq_sol.x, emit->freq_sol.y, emit->freq_sol.z,
819                          &emit->freq_sol.lat, &emit->freq_sol.lon, &dist );
820
821          solsort[0]->ans.z   = emit->freq_sol.z; /* put adjusted stuff back in sol */
822          solsort[0]->ans.lat = emit->freq_sol.lat;
823          solsort[0]->ans.lon = emit->freq_sol.lon;
824
825
826                              /* print out updated solution, if requested */
827          if ( IS_OPTw_ON( pw_misc, PO_loc_updt ) ||
828               IS_OPTw_ON( pw_val,  PO_val_CG    )    )
829          {
830             print_location( emit, solsort[0], t );
831
832                              /* print out solution data/residuals */
833             if IS_OPTw_ON( pw_misc, PO_loc_resid )
834             {
835                print_loc_resid( emit, solsort[0], t, fm, vfm, cf, x, xd );
836             }
837
838                    /* also print 'other' ambiguous solution, if any */
839             if( emit->freq_sol.ambiguous != 0 )
840             {
841                              /* fix up 'other' solution for print-out */
842                solsort[iamb]->ans.z -= p_locm->z_refract_factor *
843                    ( sq( solsort[iamb]->ans.x ) + sq( solsort[iamb]->ans.y ) );
844
845                    /* find latitude and longitude... altitude already set */
846                xy2ll(&emit->origin,
847                  solsort[iamb]->ans.x, solsort[iamb]->ans.y, solsort[iamb]->ans.z,
848                     &solsort[iamb]->ans.lat, &solsort[iamb]->ans.lon, &dist );
849
850                print_location( emit, solsort[iamb], t );
851
852                              /* print out solution data/residuals */
853                if IS_OPTw_ON( pw_misc, PO_loc_resid )
854                {
855                   print_loc_resid( emit, solsort[iamb], t, fm, vfm, cf, x, xd );
856                }
857
858             } /* end.. print 'other' solution */
859
860          } /* end.. updated solution printout block */
861
862       } /* end.. good solution block */
863
864       if ( IS_OPTw_ON( pw_misc, PO_loc_updt ) ||
```

```
Thu Nov  2 15:43:09 1995 /u/rtlt/proto/source/LF_Freq.c Page 17

865                                   IS_OPTw_ON( pw_val,  PO_val_CG   ) )
866     {
867        print_loc_fail( emit, t0, solsort[0]->ans.n_meas, failure, "end of update" );
868     }
869
870     SETBIT( 2413 );
871     return( failure );
872
873  }  /* end.. LP_Freq_Location_Update()   */
874
875
```

```
Wed Nov  1 16:08:10 1995 /u/rtlt/proto/include/LD_locat.h Page 1

1   /*                                                              LD_locat.h  */
 2   /***************************************************************************/
 3   /* CHANGE HISTORY:                                                          */
 4   /*         08 Mar 95  cmg  General upgrade prior to LBI implementation      */
 5   /*         15 May 95  cmg  mods for aspect screening in LF_LBI              */
 6   /*         16 Aug 95  cmg  Mods for air-to-air location                     */
 7   /*  1.5    12 Oct 95  cmg  LBI in A2A location                              */
 8   /*  1.7    01 Nov 95  cmg  Fix errors in array allocation: time_point_parms[] */
 9   /*                                                                          */
10   /*                                                                          */
11   /***************************************************************************/
12
13   #ifndef LD_location_incld
14   #define LD_location_incld
15
16   #include  "GD_Cpcty.h"
17
18   #define MX_MEAS 100 /* max number of measurements to be included in solution */
19   #define MX_A2AM 250    /* max number of measurements for air-to-air location */
20
21   /***************************************************************************/
22   /*                                              codes for location methods */
23   /***************************************************************************/
24   #define  NUM_LOC_METHODS    3
25
26   #define  LM_Freq    0
27   #define  LM_lbi     1
28   #define  LM_a2a     2
29
30   /***************************************************************************/
31   /*                                             some error/return code flags */
32   /***************************************************************************/
33
34   #define  RC_min_clust           0x00000001
35   #define  RC_min_span            0x00000002
36   #define  RC_max_gap             0x00000004
37   #define  RC_min_meas_left       0x00000008
38   #define  RC_not_converged       0x00000010
39   #define  RC_max_sol_cost        0x00000020
40   #define  RC_no_good_solution    0x00000040
41   #define  RC_range_too_far       0x00000080
42   #define  RC_no_converge_attempt 0x00000100
43   #define  RC_no_significant_meas 0x00000200
44   #define  RC_max_sol_speed       0x00000400
45   #define  RC_min_sol_speed       0x00000800
46   #define  RC_max_sol_altitude    0x00001000
47   #define  RC_min_sol_altitude    0x00002000
48   #define  RC_prelim_data_check   0x00004000
49   #define  RC_max_grid_cost       0x00008000
50
51   #define  RC_min_lbi_clust       0x00100000
52   #define  RC_min_lbi_span        0x00200000
53   #define  RC_max_lbi_gap         0x00400000
54
```

```
Wed Nov  1 16:08:10 1995 /u/rtlt/proto/include/LD_locat.h Page 2

55   /*****************************************************************/
 56
 57   #define MAX_MEAS_TYPES   15
 58
 59   #define MEAS_TYPE_null                  0
 60   #define MEAS_TYPE_Freq                  1
 61   #define MEAS_TYPE_lbi_phase             2
 62
 63   #define MEAS_TYPE_pseudo_range          5
 64   #define MEAS_TYPE_pseudo_bearing        6
 65   #define MEAS_TYPE_pseudo_altitude       7
 66   #define MEAS_TYPE_pseudo_speed          8
 67   #define MEAS_TYPE_pseudo_heading        9
 68   #define MEAS_TYPE_pseudo_alt_rate      10
 69
 70   typedef  short Meas_Set_Type[ MAX_MEAS_TYPES ];
 71   typedef double Meas_Prm_Type[ MAX_MEAS_TYPES ];
 72
 73   /*****************************************************************/
 74   typedef struct
 75   {
 76      int     *mtype;
 77      int     *clidx;
 78      double  *meas;
 79      double  *mvar;
 80      double  *tmeas;
 81      double  *cf;
 82      double  *x;
 83      double  *xd;
 84      double  *bl;
 85      double  *bs;
 86
 87      double   t0;
 88      short    nm_total;
 89
 90   } Loc_data_bundle_type;
 91
 92
 93   typedef struct
 94   {
 95
 96      double range;
 97      double dx[3];
 98      short  set;
 99
100   } time_point_element;
101
102   typedef time_point_element time_point_parms[ GPP_CLUSTER_CAP ];
103
104   /*****************************************************************/
105   typedef struct
106   {
107      double t0;                 /* state reference time, time-of-day, seconds */
108      double x;                  /* East position (or X-center), meters */
```

```
Wed Nov  1 16:08:10 1995  /u/rtlt/proto/include/LD_locat.h  Page 3

109        double y;                          /* North position (or Y-center), meters */
110        double h;                                    /* altitude above msl, meters */
111        double speed;                             /* magnitude of XY velocity, m/s  */
112        double heading;           /* direction of XY velocity, deg. w.r.t. north */
113        double hd;                    /* altitude rate (actually Z velocity), m/s */
114        double f0;                                   /* carrier (RF) frequency, Hertz */
115        double fd;                                          /* frequency drift, Hz/sec */
116        double p0;                                         /* LBI phase offset, cycles */
117        double range;                          /* XY range from XY-center, meters */
118        double bearing;                   /* XY bearing, degrees w.r.t. north */
119        double spare1;                                                  /* unassigned */
120        double spare2;                                                  /* unassigned */
121
122    } Standard_State;
123
124
125    #define ST_t0         0
126    #define ST_x          1
127    #define ST_y          2
128    #define ST_h          3
129    #define ST_speed      4
130    #define ST_heading    5
131    #define ST_hd         6
132    #define ST_f0         7
133    #define ST_fd         8
134    #define ST_p0         9
135    #define ST_range      10
136    #define ST_bearing    11
137    #define ST_spare1     12
138    #define ST_spare2     13
139
140    typedef union
141    {
142       double v[1];               /* allows vector-addressing of the state */
143
144       struct
145       {
146          Standard_State s;       /* State elements, in standard order */
147
148          struct
149          {         /* Auxilliary information associated with a state estimate */
150             double cost; /* cost associated with this state: mean-sq norm resid */
151
152             double sinhdg;      /* sin/cos of heading (for code efficiency) */
153             double coshdg;
154             double sinbrg;      /* sin/cos of bearing */
155             double cosbrg;
156
157          } a;
158
159       } s;
160
161    } Augmented_State;
162
```

```c
/****************************************************************/
                   /* describes the grid to be searched for minimum cost */
typedef struct
{
   short nrng;
   short nbrg;
   short nalt;
   short nspd;
   short nhdg;

double *range;
   double *bearing;                    /* measured to right, from 'nose' */
   double *altitude;
   double *speed;
   double *heading;             /* relative to 'inbound', + --> toward tail */

} A2A_Search_Grid_Type;
/****************************************************************/ typedef struct
{
   EmitterLocation ans;    /* subset of results to be retained with emitter */ double  x0;                        /* initial position guess, meters */
   double  y0;
   double  h0;
   double  f00;              /* initial guess at carrier frequency, Hertz */
   double  fd0;                  /* initial guess at frequency drift, Hz/s */ double  fp[ MX_MEAS ];     /* predicted frequency, off rcvr center, Hz */
   double  df[ MX_MEAS ];                     /* measurement residual, Hertz */
   short   good[ MX_MEAS ];  /* flag to indicate which measurements were used */

}  Loc_Solution_Type;

/****************************************************************/ typedef struct
{
   EmitterLocation_v2 ans; /* subset of results to be retained with emitter */ double  x0;                        /* initial position guess, meters */
   double  y0;
   double  h0;
   double  f00;              /* initial guess at carrier frequency, Hertz */
   double  fd0;                  /* initial guess at frequency drift, Hz/s */ double  fp[ MX_MEAS ];     /* predicted frequency, off rcvr center, Hz */
   double  df[ MX_MEAS ];                     /* measurement residual, Hertz */
   short   good[ MX_MEAS ];  /* flag to indicate which measurements were used */
   int     n_meas;                /* actual number of elements in df[], etc. */ int     iterations;           /* number of iterations used for solution */
   double  gain;                            /* limiting gain at last update */
```

```
217
218    } Loc_Solution_Type_v2;
219
220    /***********************************************************************/
221
222    typedef struct
223    {
224        EmitterLocation ans;    /* subset of results to be retained with emitter */
225
226        double  x0;                              /* initial position guess, meters */
227        double  y0;
228        double  h0;
229        double  p00;                     /* initial guess at phase offset, cycles */
230
231        double  pp[ MX_MEAS ];                        /* predicted phase, cycles */
232        double  dp[ MX_MEAS ];               /* measurement residual phase, cycles */
233        double  los[ MX_MEAS ][3];   /* Line-of-sight unit vectors, dimentionless */
234        double  bs_factor[ MX_MEAS ];       /* "off-boresight" discount, var. mult. */
235        short   good[ MX_MEAS ];   /* flag to indicate which measurements were used */
236
237    } LBI_Solution_Type;
238
239    /***********************************************************************/
240
241    typedef struct
242    {
243        EmitterLocation ans;    /* subset of results to be retained with emitter */
244
245        Augmented_State st_init;                              /* initial state */
246        Augmented_State st_trial;                               /* trial state */
247        Augmented_State st_final;                               /* final state */
248        double lm_lambda;           /* Levenberg-Marquardt 'step-size' parameter */
249        short istate[ MAX_STATE ];    /* index of state elements to be estimated */
250        short jstate[ MAX_STATE ];        /* truth table: states to be estimated */
251        short emit_id;                                 /* associated emitter ID */
252        short nstate;             /* length of state vector actually estimated */
253        short converged;                           /* 0 == solution not converged */
254
255        Meas_Prm_Type resid_window;
256        Meas_Prm_Type resid_meansq;
257        Meas_Prm_Type meas_sum;
258        Meas_Set_Type meas_set;           /* measurement types used in estimate */
259
260        double hrz[MAX_STATE];                       /* Ht x inv R x residuals */
261        double hrh[MAX_STATE*MAX_STATE];                     /* Ht x invR x H */
262
263        double dx0[MAX_STATE];                         /* raw state correction */
264        double  dx[MAX_STATE];                  /* gain-limited state correction */
265
266
267        double  pmeas[ MX_A2AM ];                       /* predicted measurement */
268        double  resid[ MX_A2AM ];                       /* measurement residual */
269        double  los[ MX_A2AM ][3];   /* Line-of-sight unit vectors, dimentionless */
270        double  bs_factor[ MX_A2AM ];       /* "off-boresight" discount, var. mult. */
```

```
Wed Nov  1 16:08:10 1995 /u/rtlt/proto/include/LD_locat.h Page 6

271      short good[ MX_A2AM ];   /* flag to indicate which measurements were used */
272
273    } A2A_Solution_Type;
274
275    #endif
276
277    /******************************************************************/
278    long LP_Freq_Location_Update( GPP_emitter *emit, int *i_attempt );
279    long LP_LBI_Location_Update( GPP_emitter *emit, int *i_attempt );
280    long LP_A2A_Location_Update( GPP_emitter *emit, int *i_attempt );
281
282
283
284
```

```
Fri Sep 22 16:52:38 1995 /u/rtlt/proto/include/ND_locat.h Page 1

1    /*                                                     ND_locat.h   */
2    /*********************************************************************/
3    /*   filename: ND_locat.h                                             */
4    /*   longname: ND_location.g.h                                        */
5    /*   description: Header for Nav location types                       */
6    /*   language: C                                                      */
7    /*   usage: typical .h header                                         */
8    /*   CHANGE HISTORY:                                                  */
9    /*        08 Mar 95 cmg  General upgrade prior to LBI implementation  */
10   /*        16 Aug 95 cmg  Mods for air-to-air location                 */
11   /*                                                                    */
12   /*********************************************************************/
13   #ifndef  ND_location_h_INCLD
14   #define  ND_location_h_INCLD
15
16   /*  data definitions associated with location processes */
17
18   /*#include "CD_ClusterType.M.h"    */
19   #include "ND_ll2xy.h"
20
21   /*********************************************************************/
22   /*                                           Emitter location version */
23   /*********************************************************************/
24   #define  EmitterLocation    EmitterLocation_v4
25
26   /*********************************************************************/
27   /*                                                             sizes */
28   /*********************************************************************/
29
30   #define MAX_STATE   MAX_STATE_v4           /* current value of MAX_STATE */
31
32   #define MAX_STATE_v4   14   /* max num emitter parameters estimated by loc */
33
34   #define MAX_STATE_v3   5                   /* obsolete values of MAX_STATE */
35   #define MAX_STATE_v2   5
36
37      /* gets index of diag element(i) in vector of upper-half of covar matrix */
38   #define CVdag(i)    ((((2*MAX_STATE+1)*(i))-((i)*(i)))/2)
39
40   /* gets index of covar element(i,j) in vector of upper-half of covar matrix */
41   #define CVindex(i,j)   ( ((i)<(j))?(CVdag((i))+(j)-(i)):(CVdag((j))+(i)-(j)) )
42
43
44   /*********************************************************************/
45   /*                                                      source_location */
46   /*********************************************************************/
47
48              /* location of a signal source on the aircraft       */
49              /* examples:- GPS antenna,                           */
50              /*          - phase center of intercept antenna,     */
51              /*          - local oscillator crystal               */
52              /* physical location and cable delay                 */
53
54   typedef struct
```

```
Fri Sep 22 16:52:38 1995 /u/rtlt/proto/include/ND_locat.h Page 2

55   {
 56       float forward; /* position on aircraft toward nose from INS, m */
 57       float right;   /* position on aircraft right of INS, m */
 58       float down;    /* position on aircraft down from INS, m: (+=down) */
 59
 60       float delay; /* effective cable delay from antenna to receiver, sec */
 61                    /* (very small number ... i.e. roughly 1E-8 sec) */
 62
 63   } source_location;
 64
 65   /********************************************************************/
 66   /*                                                      antenna_nav */
 67   /********************************************************************/
 68
 69   typedef struct /* offsets of intercept antenna at cluster ref time */
 70   {
 71       int index; /* index of antenna location connected to this channel */
 72
 73       float x; /* pos. offset of antenna relative to nav ref (usually INS), m */
 74       float y; /* in common XYZ coordinate system */
 75       float z;
 76
 77       float xd; /* vel. offset of ant relative to nav ref (usually INS), m/s */
 78       float yd;
 79       float zd;
 80
 81       float xdd; /* acc. offset of ant relative to nav ref (usually INS), m/s*2 */
 82       float ydd;
 83       float zdd;
 84
 85       float xbs;    /* unit vector along boresight in common XYZ, dimentionless */
 86       float ybs;
 87       float zbs;
 88
 89   } antenna_nav;  /* navigation data referenced to phase center */
 90                   /* of an intercept antenna */
 91
 92   /********************************************************************/
 93   /*                                                     clus_nav_tag */
 94   /********************************************************************/
 95
 96   typedef struct  /* aircraft (antenna) nav data associated with a cluster */
 97   {
 98
 99       int invalid;    /* ==0 --> data valid */
100                       /* ==1 --> too soon, nav data not available yet */
101                       /* ==2 --> too old, nav data no longer available */
102
103                       /* >=3 --> data bad, miscellaneous reasons */
104
105       int data_source; /* 0=none, 1=INS only, 2=GPS only, 3=GPS/INS */
106
107
108       double time; /* reference time for the navigation data */
```

Fri Sep 22 16:52:38 1995 /u/rtlt/proto/include/ND_locat.h Page 3

```
109
110        Geo_Origin *origin; /* origin and parameters of XYZ coordinate system */
111           /* *origin is usually a member of the associated emitter structure */
112
113        double lat;  /* current latitude of nav reference, degrees */
114        double lon;  /* current longitude of nav reference, degrees */
115        double h;    /* current altitude of nav reference, meters msl */
116
117        double x;    /* Position of nav reference (usually INS) in XYZ, meters */
118        double y;    /* in common XYZ coordinate system */
119        double z;
120
121        double xd;   /* Velocity of nav reference (usually INS) in XYZ, m/s */
122        double yd;
123        double zd;
124
125        float xdd;   /* Acceleration of nav ref (usually INS) in XYZ, m/s*2 */
126        float ydd;
127        float zdd;
128                         /*************************/
129
130        antenna_nav ant[2]; /* intercept antenna nav offsets, chan 0 and 1 */
131
132                         /*************************/
133
134    } clus_nav_tag; /* navigation data associated with a cluster */
135
136
137    /**********************************************************************/
138    /*                                                         EmitterLocation */
139    /**********************************************************************/
140                    /* general structure for emitter location estimates */
141    typedef struct
142    {
143        double t_update;   /* time of most recent measurement used in estimate */
144
145        double lat;
146        double lon;
147        double h;
148
149        double x;
150        double y;
151        double z;
152
153        double speed;
154        double heading;    /* more correctly "course": angle of ground track */
155
156        double f0;            /* estimated carrier frequency, absolute, Hertz */
157        double fd;            /* estimated carrier drift, Hz per second */
158        double p0;    /* estimated LBI phase offset between channels, cycles */
159
160        double cost;         /* cost function: weighted mean square residual */
161
162        double gain;    /* final gain for iterative convergence, normally 1.0 */
```

```
Fri Sep 22 16:52:38 1995 /u/rtlt/proto/include/ND_locat.h Page 4

163
164                 /* actual time span of data used for solution, nav time, seconds */
165         double t_first;
166         double t_last;
167
168                         /* upper half of cov. matrix, in "Standard-state-order" */
169                                 /* (defined in LD_locat.h, Standard_State) */
170         float covar[(MAX_STATE_v4*MAX_STATE_v4+MAX_STATE_v4)/2];
171
172         long n_meas;                    /* number of measurements considered */
173         long n_good;    /* final number of measurements contributing to solution */
174         long iterations;        /* interation used to converge to a solution */
175
176         long invalid;                   /* flag: 0 indicates a valid solution */
177         short ambiguous;                /* flag indicates ambiguous solution */
178         short drift_est;        /* flag: !=0 indicates carrier drift estimated */
179         short n_state;          /* number of parameters actually estimated */
180         short sol_number;               /* index of successful solution method */
181
182 }   EmitterLocation_v4;
183
184
185 /******************************************************************************/
186 /*      Old version, compatible with data recorded prior to August 1995        */
187 /******************************************************************************/
188 /*                                                              EmitterLocation_v3   */
189 /******************************************************************************/
190                         /* general structure for emitter location estimates */
191
192 typedef struct
193 {
194         double t_update;   /* time of most recent measurement used in estimate */
195
196         double lat;
197         double lon;
198         double h;
199
200         double x;
201         double y;
202         double z;
203
204         double f0;              /* estimated carrier frequency, absolute, Hertz */
205         double fd;                      /* estimated carrier drift, Hz per second */
206         double p0;      /* estimated LBI phase offset between channels, cycles */
207
208         double cost;            /* cost function: weighted mean square residual */
209
210         double gain;    /* final gain for iterative convergence, normally 1.0 */
211
212             /* actual time span of data used for solution, nav time, seconds */
213         double t_first;
214         double t_last;
215
216                         /* accuracy estimate, size of valid data in n_state */
```

Fri Sep 22 16:52:38 1995 /u/rtlt/proto/include/ND_locat.h Page 5

```
217         float covar[MAX_STATE_v3][MAX_STATE_v3];
218
219         long n_meas;                    /* number of measurements considered */
220         long n_good;    /* final number of measurements contributing to solution */
221         long iterations;                /* interation used to converge to a solution */
222
223         long invalid;                   /* flag: 0 indicates a valid solution */
224         short ambiguous;                /* flag indicates ambiguous solution */
225         short drift_est;        /* flag: !=0 indicates carrier drift estimated */
226         short n_state;                  /* number of parameters actually estimated */
227
228     } EmitterLocation_v3;
229
230
231     /****************************************************************************/
232     /*                                                    EmitterLocation_v2    */
233     /****************************************************************************/
234                             /* general structure for emitter location estimates */
235
236     typedef struct
237     {
238         double t_update;    /* time of most recent measurement used in estimate */
239
240         double lat;
241         double lon;
242         double h;
243
244         double x;
245         double y;
246         double z;
247
248         double f0;              /* estimated carrier frequency, absolute, Hertz */
249         double fd;              /* estimated carrier drift, Hz per second */
250
251         double cost;            /* cost function: weighted mean square residual */
252
253                             /* accuracy estimate, size of valid data in n_state */
254         float covar[MAX_STATE_v2][MAX_STATE_v2];
255
256
257         long invalid;                   /* flag: 0 indicates a valid solution */
258         short ambiguous;                /* flag indicates ambiguous solution */
259         short drift_est;        /* flag: !=0 indicates carrier drift estimated */
260         short n_state;                  /* number of parameters actually estimated */
261
262     } EmitterLocation_v2;
263
264     /****************************************************************************/
265     /*                                                    EmitterLocationStatus  */
266     /****************************************************************************/
267        /* structure for some status data that goes along with location solutions */
268     typedef struct
269     {
270         double t_attempt;       /* 'Loc_Time' of most recent update attempt */
```

```
Fri Sep 22 16:52:38 1995 /u/rtlt/proto/include/ND_locat.h Page 6

271
272         double fail_t0;              /* 'base time' of most recent failure */
273         double fail_cost;            /* cost of most recent failed solution */
274         long failure;                /* failure code of most recent failure */
275         long fail_nm;                          /* initial measurement count */
276         long fail_ng;             /* final edited 'good' measurement count */
277
278    }    EmitterLocationStatus;
279
280    #endif
```

We claim:

1. A system for estimating the position of a transmitter transmitting a signal waveform having a frequency in a medium comprising a platform capable of moving through said medium relative to said transmitter, signal receiving means mounted on said platform to receive said signal waveform, computer means to measure the frequency of the signal waveform as received by said signal receiving means at measurement points distributed along a measurement path as said signal receiving means is moved through said measurement path by said platform, computer means to estimate by non-linear least squares convergence the location of said transmitter starting from each of a plurality of trial locations, said non-linear least squares convergence being based on the frequency equation:

$$f = f_o + \frac{f_o}{C} \overline{V} \cdot \frac{\overline{r}}{|\overline{r}|} \quad (18)$$

in which f represents the frequency of the waveform received by said signal receiving means at said measurement points, $f_0$ is the unknown transmitter frequency, C is the rate of signal wave transmission through said medium, $\overline{V}$ is the velocity of said signal receiving means as it moves through said measurement points along said measurement path, and $\overline{r}$ is the unknown range from said transmitter to said measurement points, said computer evaluating a cost function for each location of said transmitter estimated by said least squares convergence, said cost function being derived from said frequency equation, said computer selecting the location with lowest cost function as the best estimation of the transmitter location.

2. A system as recited in claim 1, wherein said cost function is determined in accordance with the formula S= $\overline{z}^T R^{-1} \overline{z}$ in which $\overline{z}$ is a vector determined from the difference between the frequency measurements at said measurement points and the frequency measurements predicted by said computer means at said measurement points from said frequency equation for each of the estimated locations, and R is a covariance matrix of the estimated errors in the frequency measurements at said measurement points.

3. A system as recited in claim 2, wherein said least squares convergence is determined in accordance with the formula $\hat{x}_{n+1} = \hat{x}_n + \overline{\Delta x}$ in which $\hat{x}_n$ represents a set of predicted values for the unknowns in said frequency equation, $\hat{x}_{n+1}$ is the set predicted values for said unknowns after correcting $\hat{x}_n$ with $\overline{\Delta x}$, wherein $\overline{\Delta x}$ is determined from the equation $$\overline{\Delta x} = (H^T R^{-1} H)^{-1} H^T R^{-1} \overline{x}$$

in which H is a matrix of differential equation values determined from $$\frac{\partial f(\overline{x})}{\partial (\overline{x})}$$

evaluated at the predicted values of $(\overline{x})$.

4. A system as recited in claim 1, wherein said least squares convergence is determined in accordance with the formula $\hat{x}_{n+1} = \hat{x}_n + \overline{\Delta x}$ in which $\hat{x}_n$ represents a set of predicted values for the unknowns in said frequency equation, $\hat{x}_{n+1}$ is the set predicted values for said unknowns after correcting $\hat{x}_n$ with $\overline{\Delta x}$, wherein $\overline{\Delta x}$ is determined from the equation $$\overline{\Delta x} = (H^T R^{-1} H)^{-1} H^T R^{-1} \overline{x}$$

in which H is a matrix of differential equation values determined from $$\frac{\partial f(\overline{x})}{\partial (\overline{x})}$$

evaluated at the predicted values of $(\overline{x})$, R is a covariance matrix of the estimated errors in the frequency measurements, and $\overline{z}$ is a vector determined from the difference between the frequency measurements at said measurement points and the frequency measurements predicted by said computer for said measurements from said frequency equation.

5. A system as recited in claim 1, wherein one of said trial locations is at an angle extending forward along the gross flight path of said receiving means as it moves through said measurement path and a second one of said trial locations is at an angle extending aft along the gross flight path.

6. A system as recited in claim 5, wherein a third trial location is a location previously estimated by said computer means for said transmitter.

7. A system as recited in claim 1, wherein said frequency equation includes an unknown drift rate $f_d$ as follows:

$$f = f_0 + f_d t - \frac{f_0}{C} \overline{V} \cdot \frac{\overline{r}}{|\overline{r}|} \ .$$

8. A system as recited in claim 1, wherein said transmitter transmits said signal in clusters of pulses, each pulse being transmitted with said waveform, said computer means measuring the frequency of said waveform in each cluster by crosscorrelating the pulses in each cluster.

9. A system as recited in claim 8, wherein said computer means cross correlates each pulse of a cluster with each succeeding pulse of such cluster.

10. A method of estimating the position of a transmitter transmitting a signal waveform with a frequency in a medium comprising moving a signal receiving means through a measurement path in said medium while receiving said signal, measuring the frequency of the signal waveform as received by said signal receiving means at measurement points distributed along a measurement path as said signal receiving means is moved through said measurement path, estimating by non-linear least squares convergence starting from each of a plurality of trial locations, said non-linear least squares convergence being based on the frequency equation:

$$f = f_o - \frac{f_o}{C} \overline{V} \cdot \frac{\overline{r}}{|\overline{r}|}$$

in which f represents the frequency of the waveform received by said signal receiving means at said measurement points, $f_0$ is the unknown transmitter frequency, C is the rate of signal wave transmission through said medium, $\overline{V}$ is the velocity of said signal receiving means as it moves through said measurement points along said measurement path, and $\overline{r}$ is the unknown range from said transmitter to said measurement points, evaluating a cost function for each location of said transmitter estimated by non-linear least squares convergence, said cost function being derived from said frequency equation and selecting the transmitter location with the lowest cost function as the best estimation of the transmitter location.

11. A method as recited in claim 10, wherein said cost function is determined in accordance with the formula S= $\overline{z}^T R^{-1} \overline{z}$ in which $\overline{z}$ is a vector determined from the difference between the frequency measurements at said measurement points and the frequency measurements predicted at said measurement points from said frequency equation for each of the estimated locations, and R is a covariance matrix of the estimated errors in frequency measurements at said measurement points.

12. A method as recited in claim 11, wherein said least squares convergence is determined in accordance with the formula $\bar{\hat{x}}_{n+1} = \bar{\hat{x}}_n + \overline{\Delta x}$ in which $\bar{\hat{x}}_n$ represents a set of predicted values for the unknowns in said frequency equation, $\bar{\hat{x}}_{n+1}$ is the set predicted values for said unknowns after correcting $\bar{\hat{x}}_n$ with $\overline{\Delta x}$, wherein $\Delta x$ is determined from the equation $$\overline{\Delta x} = (H^T R^{-1} H)^{-1} H^T R^{-1} \bar{z}$$

in which H is a matrix of differential equation values determined from $$\frac{\partial f(\bar{x})}{\partial (\bar{x})}$$

evaluated at the predicted values of ($\bar{x}$).

13. A method as recited in claim 10, wherein said least squares convergence is determined in accordance with the formula $\bar{\hat{x}}_{n+1} = \bar{\hat{x}}_n + \overline{\Delta x}$ in which $\bar{\hat{x}}_n$ represents a set of predicted values for the unknowns in said frequency equation, $\bar{\hat{x}}_{n+1}$ is the set predicted values for said unknowns after correcting $\bar{\hat{x}}_n$ with $\overline{\Delta x}$, wherein $\overline{\Delta x}$ is determined from the equation $$\overline{\Delta x} = (H^T R^{-1} H)^{-1} H^T R^{-1} \bar{z}$$

in which H is a matrix of differential equation values determined from $$\frac{\partial f(\bar{x})}{\partial (\bar{x})}$$

evaluated at the predicted values of ($\bar{x}$), R is a covariance matrix of the estimated error in the frequency measurements, and $\bar{z}$ is a vector determined from the difference between the frequency measurements at said measurement points and the frequency measurements predicted by said computer at said measurements from said frequency equation.

14. A method as recited in claim 10, wherein one of said trial locations is at an angle extending forward along the gross flight path of said signal receiving means as it moves through said measurement path and a second one of said trial locations is at an angle extending aft of the gross flight path.

15. A method as recited in claim 14, wherein a third trial location is a location previously estimated by said computer for said transmitter.

16. A method as recited in claim 10, wherein said frequency equation includes an unknown drift rate $f_d$ as follows:

$$f = f_0 + f_d t - \frac{f_0}{C} \bar{V} \cdot \frac{\bar{r}}{|\bar{r}|} .$$

17. A method as recited in claim 10, wherein said transmitter transmits said signal in clusters of pulses, each pulse of each cluster being transmitted with said waveform, and wherein the frequency of the signal in each cluster is measured by crosscorrelating the pulses of such cluster.

18. A method as recited in claim 17, wherein each pulse of a cluster is cross correlated with the next succeeding pulse of such cluster.

* * * * *